United States Patent
Huang et al.

(10) Patent No.: US 8,121,916 B2
(45) Date of Patent: Feb. 21, 2012

(54) METHOD AND SYSTEM FOR RISK-HEDGING IN PROJECT MANAGEMENT

(75) Inventors: Pu Huang, Yorktown Heights, NY (US);
Alan J. King, South Salom, NY (US);
Dharmashankar Subramanian, Tarrytown, NY (US)

(73) Assignee: International Business Machines Corporation, Armonk, NY (US)

( * ) Notice: Subject to any disclaimer, the term of this patent is extended or adjusted under 35 U.S.C. 154(b) by 1139 days.

(21) Appl. No.: 11/689,581

(22) Filed: Mar. 22, 2007

(65) Prior Publication Data

US 2008/0235151 A1 Sep. 25, 2008

(51) Int. Cl.
*G06Q 40/00* (2006.01)

(52) U.S. Cl. ...................... 705/35; 705/36 R

(58) Field of Classification Search .......... 705/35–36 R, 705/7–8
See application file for complete search history.

(56) References Cited

U.S. PATENT DOCUMENTS

| | | | | |
|---|---|---|---|---|
| 4,744,028 | A * | 5/1988 | Karmarkar | 705/8 |
| 5,148,365 | A * | 9/1992 | Dembo | 705/36 R |
| 5,884,287 | A * | 3/1999 | Edesess | 705/36 R |
| 7,130,809 | B1 * | 10/2006 | Fors | 705/10 |
| 7,318,038 | B2 * | 1/2008 | Labbi | 705/7 |
| 7,401,041 | B2 * | 7/2008 | Goldfarb et al. | 705/36 R |
| 7,415,433 | B2 * | 8/2008 | Huneault | 705/36 R |
| 7,584,160 | B2 * | 9/2009 | Friedlander et al. | 706/45 |
| 7,630,928 | B2 * | 12/2009 | Bonissone et al. | 705/36 R |
| 7,653,449 | B2 * | 1/2010 | Hunter et al. | 700/99 |
| 7,707,575 | B2 * | 4/2010 | Huberman et al. | 718/100 |
| 7,822,669 | B2 * | 10/2010 | Tyagi et al. | 705/36 R |
| 7,835,929 | B2 * | 11/2010 | Bennett | 705/7 |
| 2002/0123953 | A1 * | 9/2002 | Goldfarb et al. | 705/36 |
| 2003/0177080 | A1 * | 9/2003 | Laurie | 705/36 |
| 2003/0208429 | A1 * | 11/2003 | Bennett | 705/36 |
| 2003/0233325 | A1 * | 12/2003 | Belyi | 705/42 |
| 2004/0001103 | A1 * | 1/2004 | Fliess et al. | 345/810 |
| 2004/0002887 | A1 * | 1/2004 | Fliess et al. | 705/9 |
| 2004/0015376 | A1 * | 1/2004 | Zhu et al. | 705/7 |
| 2004/0039620 | A1 * | 2/2004 | Ando et al. | 705/7 |
| 2004/0138897 | A1 * | 7/2004 | Eapen | 705/1 |
| 2005/0187844 | A1 * | 8/2005 | Chalermkraivuth et al. | 705/36 |
| 2005/0187849 | A1 * | 8/2005 | Bollapragada et al. | 705/36 |
| 2006/0064490 | A1 * | 3/2006 | Huberman et al. | 709/226 |
| 2006/0136328 | A1 * | 6/2006 | Angermeier | 705/38 |
| 2006/0200400 | A1 * | 9/2006 | Hunter et al. | 705/36 R |

(Continued)

OTHER PUBLICATIONS

Gabriel et al. "A multiobjective optimization model for project selection with probabilistic considerations" Socio-Economic Planning Sciences, Available online May 25, 2005.*

(Continued)

*Primary Examiner* — Narayanswamy Subramanian
(74) *Attorney, Agent, or Firm* — Cantor Colburn LLP; Daniels Morris

(57) ABSTRACT

A computer program product stored on machine readable media including machine readable instructions for selecting a project portfolio from available projects, the instructions for implementing a method include inputting an investment cost and a return for each available project and user-specified constraints; creating a formulation, the formulation comprising the investment cost and the return for each available project, the constraints and variables, the variables comprising for each available project a threshold probability of success and a selection decision; solving the formulation to select the project portfolio and to determine the threshold probability of success for each available project; and outputting the project portfolio and the threshold probability of success for each available project.

4 Claims, 2 Drawing Sheets

U.S. PATENT DOCUMENTS

| | | | |
|---|---|---|---|
| 2006/0206477 A1* | 9/2006 | Dalvi et al. | 707/5 |
| 2006/0212375 A1* | 9/2006 | Funez et al. | 705/35 |
| 2007/0174161 A1* | 7/2007 | Bullock et al. | 705/35 |
| 2008/0114779 A1* | 5/2008 | Friedlander et al. | 707/100 |
| 2010/0010856 A1* | 1/2010 | Chua et al. | 705/8 |

OTHER PUBLICATIONS

Medaglia et al. "A multiobjective model for the selection and timing of public enterprise projects" Socio-Economic Planning Sciences, Available online Sep. 7, 2006.*

Nowak, Maciej "Multicriteria Technique for Project Selection Under Risk" Proceedings of the 5th International Conference RelStat'05, Transport and Telecommunication vol. 7, No. 1, 2006.*

Benli et al. "Making Project Selection Decisions: A Multi-Period Capital Budgeting Problem", International Journal of Industrial Engineering, 9(3), 2002 pp. 301-310.*

Bard Jonathan, F "Using Multicriteria Methods in the Early Stages of New Product Development" The Journal of the Operational Research Society, vol. 41, No. 8 (Aug. 1990), pp. 755-766.*

* cited by examiner

METHOD AND SYSTEM FOR RISK-HEDGING IN PROJECT MANAGEMENT

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND OF THE INVENTION

1. Field of the Invention

This invention relates to selecting project portfolios.

2. Description of the Related Art

Businesses may have opportunities to perform several projects. On many occasions, the businesses may have opportunities to perform more potential projects than the businesses have resources to accomplish all the potential projects. Project portfolio selection can have a profound affect on the final value that a project portfolio can deliver.

Project portfolio selection can be a complicated process. Traditionally, many factors have to be considered in a project portfolio selection process. In addition, uncertainty has to be accounted for with respect to all the factors. For example, for a project heavily dependent on energy, energy prices have to be estimated for the duration of the project. Estimated energy prices have an associated uncertainty. The associated uncertainty may be a factor in determining if the project is successful or not. Typically, the associated uncertainty is based on a probability.

Probabilities used to predict success or failure of the potential projects may be difficult to estimate and may be highly subjective. Highly subjective probabilities may lead to selecting projects that fail.

Methods known in the art of portfolio selection typically require information about three aspects of projects—investment, return, and risk. The three aspects may be used as input into a portfolio selection algorithm. One of the methods creates a portfolio by maximizing the expected return on an investment for a given level of risk. Another method minimizes the risk for a given level of expected return. These methods include an efficient frontier method of Markowitz, a capital asset pricing model of Sharpe, and extensions of these methods.

One problem with applying these methods to project portfolio selection is that project risks are difficult to estimate. While financial securities may have historical data that can be used to estimate risks, typically, there is little or no historical data available to estimate project risks. Also, when historical data may be available from similar projects, the historical data may be questionable for use in calculating project risks because the projects are not the same. These methods may fail without accurate risk calculations.

What are needed are a method and a system for selecting a project portfolio.

SUMMARY OF THE INVENTION

The shortcomings of the prior art are overcome and additional advantages are provided through a computer program product stored on machine readable media including machine readable instructions for selecting a project portfolio from available projects, the instructions for implementing a method include inputting an investment cost and a return for each available project and user-specified constraints; creating a formulation, the formulation comprising the investment cost and the return for each available project, the constraints and variables, the variables comprising for each available project a threshold probability of success and a selection decision; solving the formulation to select the project portfolio and to determine the threshold probability of success for each available project; and outputting the project portfolio and the threshold probability of success for each available project.

Also disclosed is a computer system comprising a computer program product having instructions for selecting a project portfolio from available projects, the product includes instructions for inputting an investment cost and a return for each available project and user-specified constraints; creating a formulation, the formulation comprising the investment cost and the return for each available project, the constraints and variables, the variables comprising for each available project a threshold probability of success and a selection decision; solving the formulation to select the project portfolio and to determine the threshold probability of success for each available project; and displaying the threshold probability of success for each available project.

System and computer program products corresponding to the above-summarized methods are also described and claimed herein.

Additional features and advantages are realized through the techniques of the present invention. Other embodiments and aspects of the invention are described in detail herein and are considered a part of the claimed invention. For a better understanding of the invention with advantages and features, refer to the description and to the drawings.

TECHNICAL EFFECTS

As a result of the summarized invention, technically we have achieved a solution with a computer program product stored on machine readable media including machine readable instructions for selecting a project portfolio from available projects, the instructions for implementing a method include inputting an investment cost and a return for each available project and user-specified constraints; creating a formulation, the formulation comprising the investment cost and the return for each available project, the constraints and variables, the variables comprising for each available project a threshold probability of success and a selection decision; solving the formulation to select the project portfolio and to determine the threshold probability of success for each available project; and outputting the project portfolio and the threshold probability of success for each available project.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION OF THE INVENTION

The teachings herein provide a method for selecting a project portfolio. The method uses an estimated cost and an estimated return for each project to calculate a "threshold" or "worst-case" probability of success for each of the projects. Using the probabilities, the method selects which projects should be performed. The method typically uses operations research techniques such as optimization to compute the probabilities and select the projects for the project portfolio. Before the method is discussed in detail, certain definitions are provided.

The term "estimated cost" relates to costs required to perform a project. For example, estimated costs for the project may include labor and material costs. In general, estimated costs are known with a high level of certainty because the projects have defined specifications or capabilities. The term "estimated return" relates to revenue that a selected project will provide if the selected project is implemented. In general, estimated revenues are also known with a high level of certainty because marketing and sales estimates will incorporate the defined specifications or capabilities. The term "constraint" relates to restrictions imposed on the method for selecting a project portfolio. Typical constraints may include a budget, manpower, and logical restrictions. One example of a logical restriction is preventing two projects from being performed at the same time. The term "operations research" relates to applying scientific methods to decision making to elicit a best possible solution to a problem. The term "optimization" relates to seeking to minimize or maximize a real function by systematically choosing values of variables from an allowed set. The term "formulation" relates to describing a problem using mathematical terms.

Figure 1:
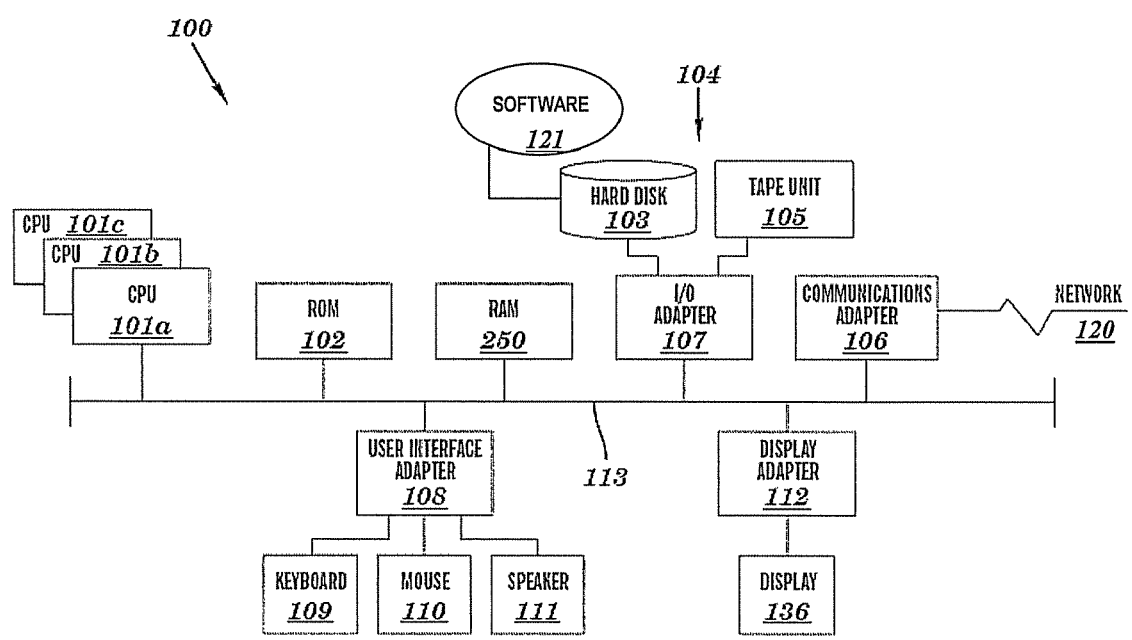
FIG. 1 depicts aspects of a computing infrastructure for implementation of the teachings herein.

Referring now to FIG. 1, an embodiment of a computer processing system 100 for implementing the teachings herein is depicted. System 100 has one or more central processing units (processors) 101a, 101b, 101c, etc. (collectively or generically referred to as processor(s) 101). In one embodiment, each processor 101 may include a reduced instruction set computer (RISC) microprocessor. Processors 101 are coupled to system memory 250 and various other components via a system bus 113. Read only memory (ROM) 102 is coupled to the system bus 113 and may include a basic input/output system (BIOS), which controls certain basic functions of system 100.

FIG. 1 further depicts an I/O adapter 107 and a network adapter 106 coupled to the system bus 113. I/O adapter 107 may be a small computer system interface (SCSI) adapter that communicates with a hard disk 103 and/or tape storage drive 105 or any other similar component. I/O adapter 107, hard disk 103, and tape storage device 105 are collectively referred to herein as mass storage 104. The network adapter 106 interconnects bus 113 with a network 120 enabling data processing system 100 to communicate with other such systems. The network 120 can be a local-area network (LAN), a metro-area network (MAN), or wide-area network (WAN), such as the Internet or World Wide Web. Display monitor 136 is connected to system bus 113 by display adaptor 112, which may include a graphics adapter to improve the performance of graphics intensive applications and a video controller. In one embodiment, adapters 107, 106, and 112 may be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Components Interface (PCI). Additional input/output devices are shown as connected to system bus 113 via user interface adapter 108 and display adapter 112. A keyboard 109, mouse 110, and speaker 111 all interconnected to bus 113 via user interface adapter 108, which may include, for example, a Super I/O chip integrating multiple device adapters into a single integrated circuit.

As disclosed herein, the system 100 includes machine readable instructions stored on machine-readable media (for example, the hard disk 103) for selecting a project portfolio. As disclosed herein, the instructions are referred to as project portfolio selection software 121. The project portfolio selection software 121 may be produced using software development tools as are known in the art. The project portfolio selection software 121 may be provided as an "add-in" to an application (where "add-in" is taken to mean supplemental program code as is known in the art). In such embodiments, the software 121 replaces or supplements structures of the application for providing project portfolio selection.

Thus, as configured FIG. 1, the system 100 includes processing means in the form of processors 101, storage means including system memory 250 and mass storage 104, input means such as keyboard 109 and mouse 110, and output means including speaker 111 and display 136. In one embodiment a portion of system memory 250 and mass storage 104 collectively store an operating system such as the AIX® operating system from IBM Corporation to coordinate the functions of the various components shown in FIG. 1.

It will be appreciated that the system 100 can be any suitable computer (e.g., 486, Pentium, Pentium II, Macintosh), Windows-based terminal, wireless device, information appliance, RISC Power PC, X-device, workstation, mini-computer, mainframe computer, cell phone, personal digital assistant (PDA) or other computing device.

Examples of operating systems supported by the system 100 include Windows 95, Windows 98, Windows NT 4.0, Windows XP, Windows 2000, Windows CE, Macintosh, Java, LINUX, and UNIX, or any other suitable operating system.

Users of the system 100 can connect to the network 120 through any suitable connection, such as standard telephone lines, digital subscriber line, LAN or WAN links (e.g., T1, T3), broadband connections (Frame Relay, ATM), and wireless connections (e.g., 802.11(a), 802.11(b), 802.11(g)).

Focusing on the project portfolio selection software 121, a business typically may be faced with the opportunity to perform "N" projects. Each of the projects requires an investment cost "c" and provides a return "v". The business may also be faced with constraints "D" on costs and logistics of the N projects. The project portfolio selection software 121 computes a probability p for an outcome "the project is successful" where p is the threshold or worst-case probability of success. The project portfolio selection software 121 also selects "K," projects for implementation from the N projects.

The project portfolio selection software 121 may be described using mathematical notation. For example, $c_i$ represents the investment cost for an i-th project out of N available projects to select from. Similarly, $v_i$ represents the return for the i-th project. D represents user-specified constraints.

One exemplary embodiment of the project portfolio selection software 121 formulates selecting the project portfolio with the following formulation:

$$\min \sum_{i=1}^{N} \beta v_i p_i - c_i x_i$$

$$\sum_{i=1}^{N} c_i x_i \leq \sum_{i=1}^{N} v_i p_i$$

$$p_i \leq x_i \quad \forall\, i = 1, 2, \ldots, N$$

$$x_i \in \{0, 1\} \quad \forall\, i = 1, 2, \ldots, N$$

$$[x_1, x_2, \ldots, x_N] \in D$$

where $\beta$ is a number greater than 0 and less than 1; $x_i$ is the decision whether the i-th project will be selected or not (if the i-th project is selected, $x_i=1$; otherwise, $x_i=0$); and $p_i$ is the threshold probability of the i-th project (if the i-th project is selected, $p_i$ is a number between 0 and 1; otherwise, $p_i=0$). The project portfolio selection software 121 calculates $x_i$ and $p_i$ for each of the N projects.

The expression, $[x_1, x_2, \ldots, x_N] \in D$, represents the project portfolio, $[x_1, x_2, \ldots, x_N]$, conforming to the user-specified constraints, D. One example of the user-specified constraint is a budget constraint. The budget constraint may be expressed as $$\sum_{i=1}^{N} c_i x_i \leq B,$$

where B is a budget. Another example is a logical restriction on projects. For instance, a mutual exclusion restriction on projects i and j (i.e., one can select either one or none of them, but not both) can be expressed as $x_i + x_j \leq 1$.

The project portfolio selection software 121 solves the above formulation using a mixed integer program solver. One example of the mixed integer program solver is SYMPHONY by the Computational Infrastructure for Operations Research (COIN-OR).

Figure 2:
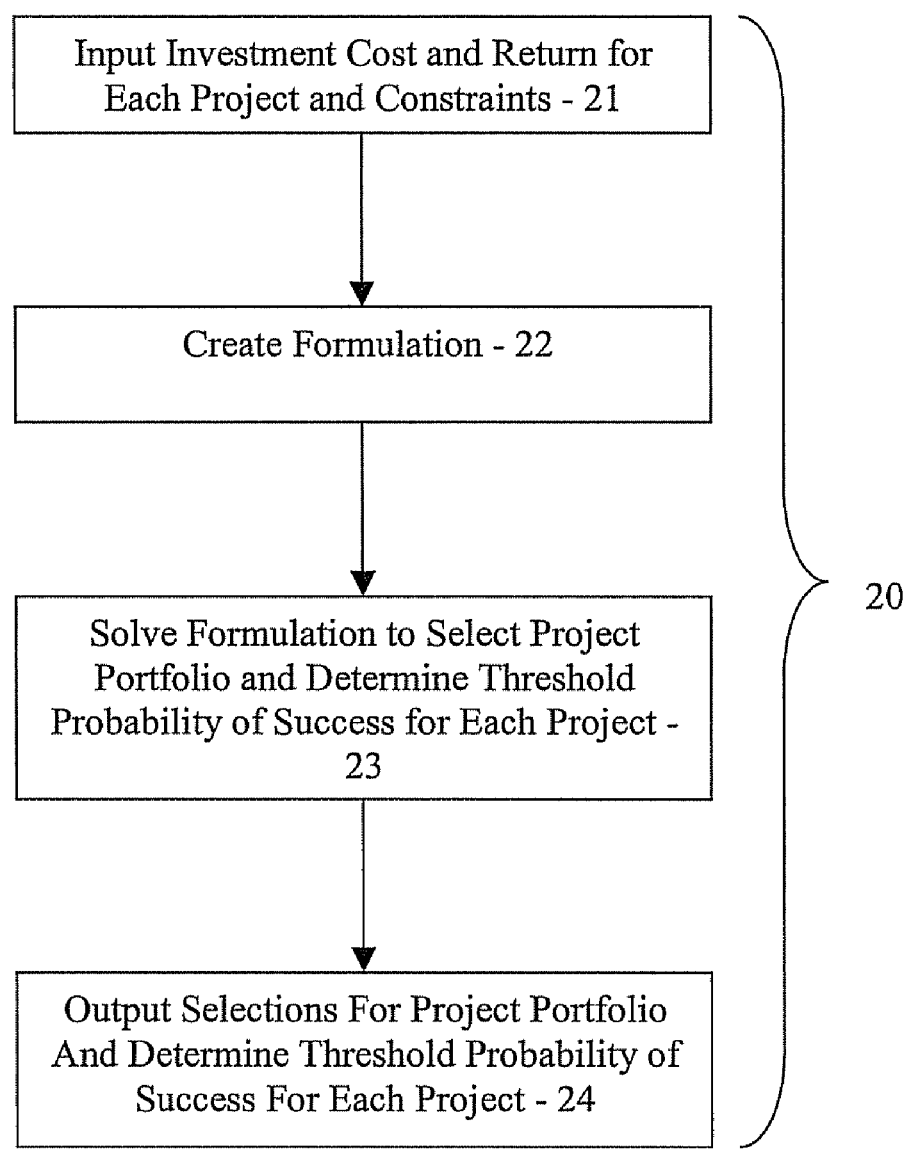
FIG. 2 presents an exemplary flow diagram of a method for selecting a project portfolio and computing a threshold probability of success for each project.

FIG. 2 presents an exemplary flow diagram of a method 20 for selecting a project portfolio from a group of available projects. A first step 21 calls for inputting the investment cost and the return of each available project and the user-specified constraints. A second step 22 calls for creating a formulation for selecting the project portfolio. The formulation typically includes inputs from the first step 21 and, for each available project, variables representing the threshold probability of success and a selection decision. A third step 23 calls for solving the formulation to select for the project portfolio and determining the threshold probabilities of success for each available project. Typically, the third step 23 includes solving the formulation using a mixed-integer program solver. In general, the project portfolio includes projects that have a "yes" selection decision as a result of the third step 23. A fourth step 24 calls for outputting selections for the project portfolio and the threshold probabilities of success for each available project. In one exemplary embodiment, output may be in a format suitable for at least one of display by the display monitor 136, transmission via the network 120, and storage as a data file in mass storage 104.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those sildled in the art, both now and in the future, may make various improvements and enhancements which fall within the scope of the claims which follow. These claims should be construed to maintain the proper protection for the invention first described.

What is claimed is:

1. A non-transitory computer readable medium comprising computer readable instructions for selecting a project portfolio from available projects, the instructions for implementing a method comprising:
   receiving an investment cost and a return for each available project;
   receiving user-specified constraints;
   creating a formulation for each available project, each formulation including a plurality of requirements based on the investment cost and the return for the available project to which it relates, the user-specified constraints and a probability of success variable for the available project to which it relates;
   solving the formulation for each available project to determine the threshold probability of success;
   selecting the project portfolio from the available projects such that each selected project has threshold probability of success exceeds a threshold value and such that the sum of the investment costs for all selected projects is less than a budget constraint (B) and such that no two selected projects violate a logical restriction included in the user-specified constraints; and
   outputting the project portfolio.

2. The non-transitory computer readable medium as in claim 1, wherein creating a formulation comprises creating the following formulation:

$$\min \sum_{i=1}^{N} \beta v_i p_i - c_i x_i$$

$$\sum_{i=1}^{N} c_i x_i \leq \sum_{i=1}^{N} v_i p_i$$

$$p_i \leq x_i \quad \forall\, i = 1, 2, \ldots, N$$

$$x_i \in \{0, 1\} \quad \forall\, i = 1, 2, \ldots, N$$

$$[x_1, x_2, \ldots, x_N] \in D$$

wherein N is a number of available projects; $\beta$ is a number greater than 0 and less than 1; $c_i$ is the investment cost of the i-th project; $v_i$ is the return of the i-th project; $x_i$ is the selection decision for the i-th project, $x_i$ equal to 1 indicates to select the i-th project and $x_i$ equal to 0 to not select the i-th project; $p_i$ is the threshold probability of success of the i-th project, $p_i$ is a number between 0 and 1 if the i-th project is selected or 0 otherwise; $[x_1, x_2, \ldots, x_n]$ represents the project portfolio, and D represents the user-specified constraints.

3. The non-transitory computer readable medium as in claim 2, further comprising computing for each available project the selection decision $x_i$.

4. The non-transitory computer readable medium as in claim 1, wherein solving comprises using a mixed integer program solver.

* * * * *